(Model.) 2 Sheets—Sheet 1.

A. KHOTINSKY.
DIVING APPARATUS.

No. 244,062. Patented July 12, 1881.

WITNESSES;
James P. F. Kelly.
Chas. Wahlers.

INVENTOR;
Achilles Khotinsky (Model.)

2 Sheets—Sheet 2.

A. KHOTINSKY.
DIVING APPARATUS.

No. 244,062.

Patented July 12, 1881.

WITNESSES;
James R. F. Kelly.
Chas. Wahlers.

INVENTOR;
Achilles Khotinsky

UNITED STATES PATENT OFFICE.

ACHILLES KHOTINSKY, OF NEW YORK, N. Y.

DIVING APPARATUS.

SPECIFICATION forming part of Letters Patent No. 244,062, dated July 12, 1881.

Application filed May 2, 1881. (Model.)

*To all whom it may concern:*

Be it known that I, ACHILLES KHOTINSKY, of the city, county, and State of New York, have invented a new and Improved Diving Apparatus, which invention is fully set forth in the following specification, reference being had to the accompanying drawings, in which—

Figure 2:
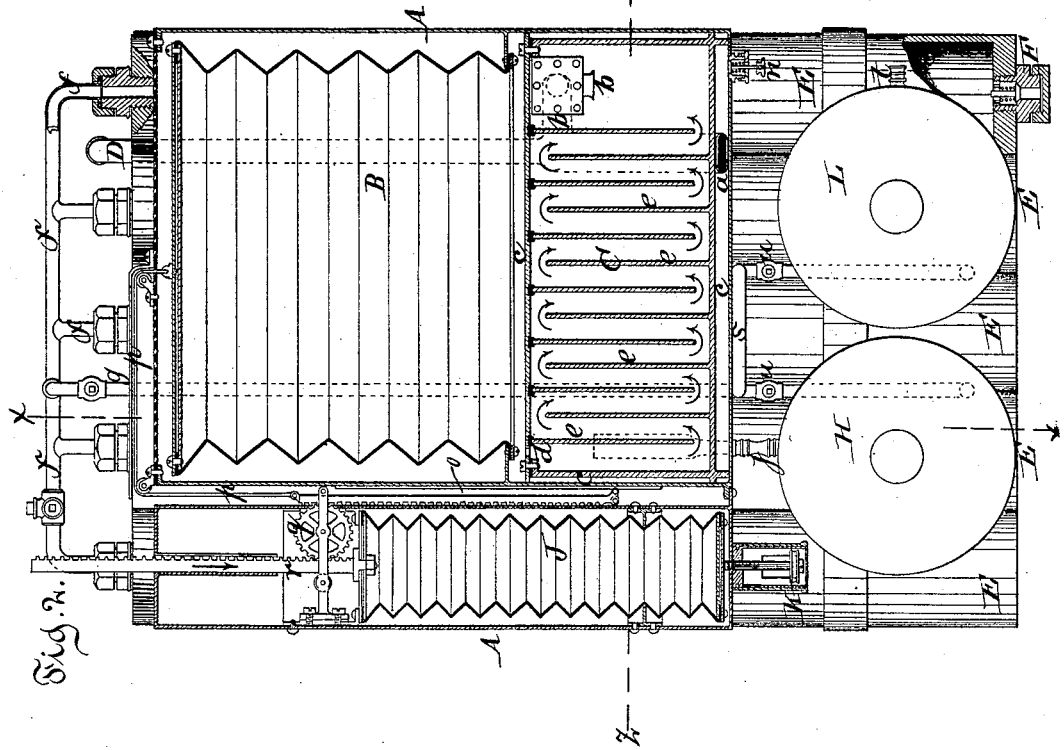
Figure 1:
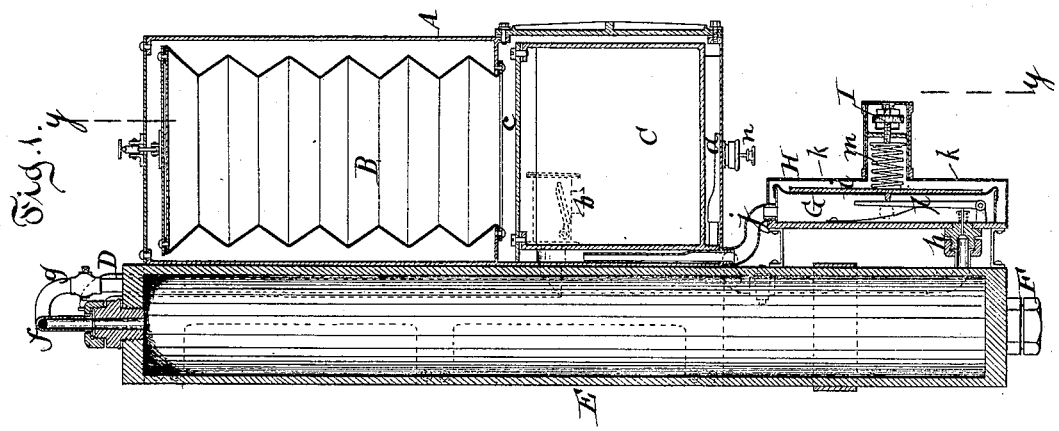
Figure 3:
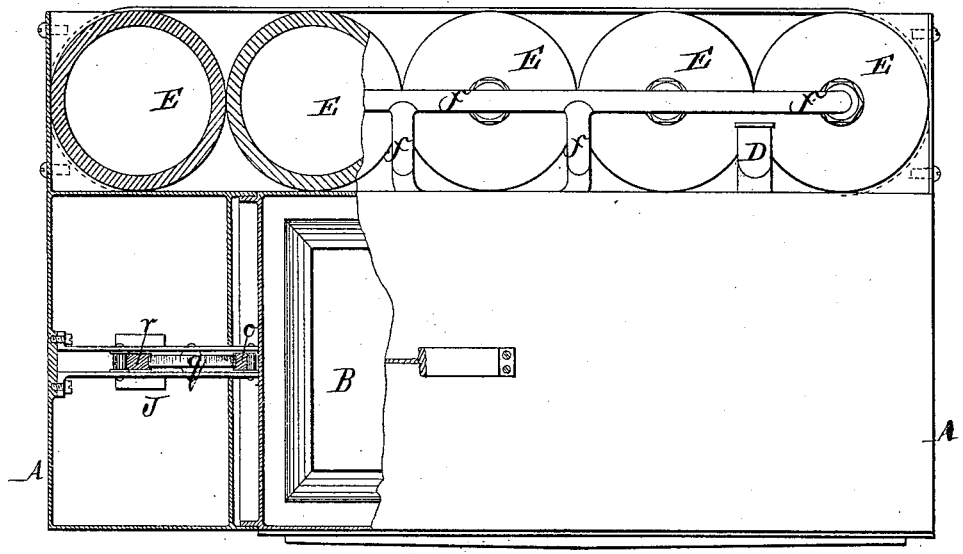
Figure 4:
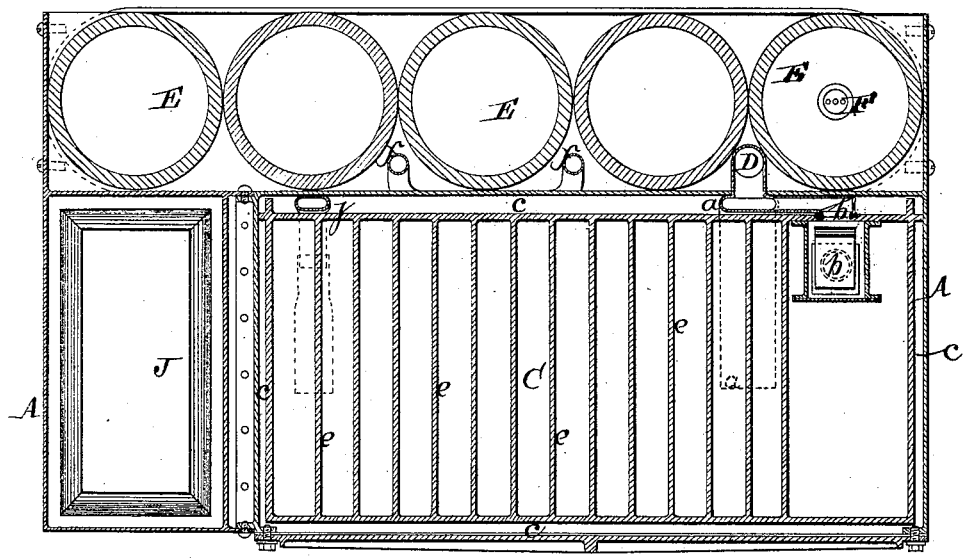

Figure 1 represents a transverse vertical section in the plane $x\ x$, Fig. 2. Fig. 2 is a longitudinal vertical section in the plane $y\ y$, Fig. 1. Fig. 3 is a plan view, partly in section. Fig. 4 is a transverse section in the plane $z\ z$, Fig. 2.

Similar letters indicate corresponding parts.

This invention relates to an improvement in diving apparatus; and it consists in the combination of reservoirs (one or more) containing oxygen, diaphragm-chamber containing a diaphragm for regulating the outflow of oxygen, tube for leading the oxygen into a mixing-bellows, bellows-chamber containing a mixing-bellows for receiving the exhaled air and the oxygen, purifier for freeing the air to be inhaled from its noxious qualities, and breathing-pipe provided with two branches, one for leading the exhaled air into the mixing-bellows and the other for supplying pure air from the purifying-chamber to the diver, all combined and operating as will be hereinafter more fully set forth; also, in the combination, in a diving apparatus, of reservoirs (one or more) containing oxygen, diaphragm-chamber containing a diaphragm for regulating the outflow of oxygen, tube for leading the oxygen into a mixing-bellows, bellows-chamber containing mixing-bellows for receiving the exhaled air and oxygen, pressure-bellows for regulating the pressure in the mixing-bellows, purifier for freeing the air to be inhaled of its noxious qualities, and a breathing-pipe provided with two branches, all combined and operating as will be hereinafter more fully set forth; also, in the combination, in a diving apparatus, of reservoirs (one or more) containing oxygen, diaphragm-chamber containing a diaphragm for regulating the outflow of oxygen, tube for leading the oxygen to the mixing-bellows, bellows-chamber containing a mixing-bellows for receiving the exhaled air and oxygen, pressure-bellows for regulating the pressure in the mixing-bellows, set-screw for modifying the efficiency of said pressure-bellows, purifier for freeing the air to be inhaled of its noxious qualities, and a breathing-pipe provided with two branches, all combined and operating as will be hereinafter described; also, in the combination of a diving apparatus, constructed as set forth, with a secondary chamber for receiving and supplying oxygen to a lamp, as will be hereinafter described; also, in the combination, in a diving apparatus, of reservoirs (one or more) containing oxygen, diaphragm-chamber containing a diaphragm for regulating the outflow of oxygen, set-screw for modifying the efficiency of said diaphragm, tube for leading the oxygen into a mixing-bellows, bellows-chamber containing mixing-bellows for mixing the exhaled air and oxygen, pressure-bellows for regulating the pressure in the mixing-bellows, purifier for freeing the air to be inhaled of its noxious qualities, and a breathing-pipe provided with two branches, all combined and operating as will be hereinafter more fully set forth; also, in the method hereinafter described for supplying air fit for breathing by injecting into a suitable mixing-chamber a given quantity of nitrogen and of oxygen, inhaling this mixture, and blowing the exhalation back into said mixing-chamber, whence the nitrogen, having been freed from carbonic acid and other impurities, is again mixed with oxygen, again inhaled, and so on in succession.

In the drawings, the letter A designates a case of sheet metal or other suitable material. One part of this case is occupied by a bellows-chamber containing a mixing-bellows, B. Below this mixing-bellows is a purifying-chamber, C, which is partly filled with barium hydrate or other substance which readily absorbs carbonic acid.

D is a breathing-pipe, which is attached to the diver's mask, and through which the diver inhales and exhales. This pipe D is provided with two branches, $a\ b$, each of which is provided with a valve. In exhaling, the valve in the branch $b$ is closed, and the exhaled air, consisting of nitrogen, carbonic acid, and aqueous vapor, passes out through the branch $a$ into the space $c$ surrounding the purifying-chamber C, and up into the bellows B. In inhaling, the valve in the branch $a$ closes and the one in the branch *b* opens. Hence the exhaled air which has passed into the mixing-bellows B is compelled to flow into the purifying-chamber C through the opening *d* in its top, Fig. 2, and through the same. This purifying-chamber C is constructed with partitions *e e*, and is partly filled with barium hydrate or some other suitable solution which readily absorbs carbonic acid. The exhaled air, in flowing through this purifying-chamber, as indicated by arrows, flows through this barium hydrate or other solution, whereby the carbonic acid is absorbed, and only the nitrogen of the exhaled air and a certain part of oxygen not used by breathing pass in at the branch *b*.

E E are reservoirs (one or more) containing oxygen, and which connect with each other by tubes *f f*. These reservoirs are firmly secured to the case A. Pure oxygen is forced into these reservoirs E E through the opening F to a pressure of about sixty atmospheres. The opening F is then closed by a screw-cap or other suitable means. From these reservoirs E the oxygen flows into a tube, *g*, Figs. 1 and 2, which leads into the space G, and which tube is closed by a valve, *h*, Fig. 1. The space G is covered by a diaphragm, *i*, in the diaphragm-chamber H. This space G connects with the mixing-bellows B by a tube, *j*, which leads into the space *c* surrounding the purifying-chamber C.

The diaphragm-chamber H is perforated, as at *k k*, so that the diaphragm *i* is pressed inward by the water flowing in through these openings *k k* when the diver is under water. The diaphragm *i*, in being pressed in, presses on the arm *l*, Fig. 1, which arm presses the valve *h* inward, and thus has a tendency to allow the oxygen in the reservoir E to escape.

Ordinarily the pressure of oxygen from the inside of the tube *g* on the valve *h* counterbalances the pressure of the arm *l* from the outside; but when the diver begins to inhale a partial vacuum is formed in the space *c*, as well as the tube *j* and space G. Thus, the pressure in the space G being diminished, the diaphragm *i* is pressed inward, and the arm *l*, pressing the valve *h* inward, allows some oxygen to escape at the moment of inhalation, but at no other time.

As the pressure of oxygen in the reservoir varies, the pressure of the diaphragm *i* can be regulated by the set-screw I acting on spring *m*. This set-screw I also serves to adjust the diaphragm *i* for greater or less depths of water, for if the diver has to work in deep water the pressure of the water on the diaphragm *i* is increased, and by turning the screw in the proper direction the pressure of the spring *m*, to which it is connected, is lessened, while if the diver ascends and the apparatus is thus carried nearer the surface the pressure of the water on the diaphragm *i* diminishes, and the pressure of the spring *m* can be increased. By this means perfect equilibrium can always be maintained.

The oxygen, on escaping through the valve *h*, passes into the space G and through the tube *j* into the space *c* surrounding the purifying-chamber, and thence into the mixing-bellows B. From thence it passes, together with the exhaled air, into the purifying-chamber through the opening *d*. It then passes through this purifying-chamber C, and passes into the opening *b*, together with the nitrogen coming from the exhaled air. Thus a mixture of oxygen and nitrogen corresponding to the ordinary atmosphere is formed, and is inhaled by the diver through the pipe D.

Before beginning to operate the machine a certain quantity of nitrogen is also introduced into the mixing-bellows B through the valve *n*. The mixture in the bellows B is caused to flow out at the moment of inhalation by the pressure of the water on the top and sides of bellows. This pressure must, however, not be too great, and in order to counterbalance it I provide a pressure-bellows, J. If, now, the bellows B is pressed down too low, it causes the rack *o*, Fig. 2, to ascend, being connected to it by means of the chain or rope *p*. This causes the cog-wheel *q* to revolve and the secondary rack *r* to descend in the direction of the arrow. By this means the bellows J, containing air or gas, is compressed, thus counterbalancing the pressure of water on the bellows B.

The pressure-bellows J can be adjusted for various pressures by the set-screw K, so that the diver can descend with the apparatus into greater or less depths of water.

From the diaphragm-chamber H, Fig. 2, leads a tube, *s*, into a secondary chamber, L, conveying oxygen into the same. From this chamber L the oxygen flows through the tube *t*, and can be fed to a lamp, which may thus be used under water. The products of combustion can be led into the breathing-pipe D, and thence through the mixing-bellows and purifying-chamber, the same as the exhalations of the diver. When no lamp is required the tube *s* is closed by stop-cocks *u u*.

The whole apparatus is made of a form and size convenient to carry, and is strapped on the back of the diver, who thus carries the apparatus and means of breathing with him under water wherever he goes. This apparatus is not only useful for working under water; but if a person has to descend into a well or coal-mine, which, as is well known, are often filled with carbonic-acid and other noxious gases, he will find the apparatus just as effective.

What I claim as new, and desire to secure by Letters Patent, is—

1. The combination, in a diving apparatus, of reservoirs E, (one or more,) containing oxygen, diaphragm-chamber H, containing a diaphragm for regulating the outflow of oxygen, tube *j* for conveying the oxygen to a mixing-bellows, B, bellows-chamber containing a mixing-bellows, B, purifier C for freeing the air to be inhaled of its noxious qualities, and breathing-pipe D, provided with two branches, a and b, all combined and operating substantially in the manner and for the purpose described.

2. The combination, in a diving apparatus, of a reservoir, E, (one or more,) containing oxygen, diaphragm-chamber H, containing a diaphragm for regulating the outflow of oxygen, tube j for leading the oxygen to the mixing-bellows B, bellows-chamber containing mixing-bellows B, pressure-bellows J for regulating the pressure in the mixing-bellows, purifier C, and breathing-pipe D, provided with two branches, all combined and operating substantially in the manner and for the purpose set forth.

3. The combination, in a diving apparatus, of reservoirs E, (one or more,) containing oxygen, diaphragm-chamber H, containing a diaphragm for regulating the outflow of oxygen, tube j for leading the oxygen to a mixing-bellows, B, bellows-chamber containing mixing-bellows B, pressure-bellows J, set-screw K for modifying the efficiency of the pressure-bellows, purifier C, and breathing-pipe D, provided with two branches, all combined and operating substantially as described.

4. The combination of a diving apparatus constructed, substantially as described, with a secondary chamber, L, for receiving and supplying oxygen to a lamp, substantially as set forth.

5. The combination, in a diving apparatus, of reservoirs E, (one or more,) containing oxygen, diaphragm-chamber H, containing a diaphragm for regulating the outflow of oxygen, set-screw I for modifying the efficiency of said diaphragm, tube for leading the oxygen into mixing-bellows B, bellows-chamber containing mixing-bellows B, pressure-bellows J, purifier C, and breathing-pipe D, provided with two branches, all combined and operating substantially in the manner and for the purpose set forth.

6. The method, substantially as herein described, for supplying air fit for breathing, which consists in injecting into a suitable mixing and purifying chamber, into which the breathed air is received, a given quantity of oxygen, and freeing said mixture from its carbonic acid by suitable decarbonizing-salts, whereby the mixture is rendered again fit for breathing, as and for the purpose set forth.

In testimony that I claim the foregoing I have hereunto set my hand and seal this 26th day of May, 1879.

ACHILLES KHOTINSKY. [L. S.]

Witnesses:
W. HAUFF,
E. F. KASTENHUBER.